United States Patent [19]

Haylock et al.

[11] Patent Number: 4,585,464

[45] Date of Patent: Apr. 29, 1986

[54] LOW MOISTURE ABSORPTION ABRASIVE BRISTLE OF POLYBUTYLENE TEREPHTHALATE

[75] Inventors: John C. Haylock, Dennysville, Maine; R. Saunders, Richmond, Va.; Garland L. Turner, Chesterfield, Va.; Ian C. Twilley, Chester, Va.

[73] Assignee: Allied Corporation, Morris Township, Morris County, N.J.

[21] Appl. No.: 736,414

[22] Filed: May 20, 1985

Related U.S. Application Data

[63] Continuation of Ser. No. 514,740, Jul. 18, 1983, abandoned.

[51] Int. Cl.$^4$ .................................................. C09K 3/14
[52] U.S. Cl. ........................................ 51/298; 51/295; 428/372
[58] Field of Search .................. 51/298, 295; 428/372

[56] References Cited

U.S. PATENT DOCUMENTS 3,522,342  7/1970  Nangesser et al. ................... 51/295

OTHER PUBLICATIONS

Brydson, J. A., Plastics Materials, London, Newnes-Butterworths, 1975, pp. 407, 408, 591, 592.
Plastics, Edition 5, Desk-Top Data Bank, Book B, Dec. 1981, Corduva Pub., San Diego, pp. B-256, 257, 478, 479, 488.

Primary Examiner—James Derrington
Attorney, Agent, or Firm—Anthony J. Stewart; Patrick L. Henry

[57] ABSTRACT

A bristle material is disclosed having improved stiffness comprised of a thermoplastic matrix comprising polybutylene terephthalate and containing an abrasive filler.

6 Claims, No Drawings

LOW MOISTURE ABSORPTION ABRASIVE BRISTLE OF POLYBUTYLENE TEREPHTHALATE

This application is a continuation of application Ser. No. 514,740 filed July 18, 1983, now abandoned.

BACKGROUND OF THE INVENTION

The present invention relates to bristles having an abrasive filler. More particularly, it relates to abrasive bristles of the type disclosed in U.S. Pat. No. 3,522,342. This patent discloses a method for making a bristle material comprised of a thermoplastic matrix and an abrasive filler material dispersed therein. The thermoplastic materials contemplated, include nylon, and blends of nylon and polyester. While these bristles are generally stiff and abrasive, in applications where they are exposed to hot water their stiffness (expressed as tensile modulus) tends to suffer because of water absorption.

SUMMARY OF THE INVENTION

The present invention comprises a bristle material having a diameter ranging from about 0.02 to 0.09 inches, and consisting essentially of polybutylene terephthalate (PBT), and an abrasive filler material dispersed therein, said PBT having an intrinsic viscosity (I.V.) of at least about 0.60 in the bristle; and said abrasive filler being present in an amount of about 5 to about 50 weight percent based on the total weight of the bristle.

DETAILED DESCRIPTION

The bristle material of the present invention consists essentially of a thermoplastic matrix of polybutylene terephthalate having a relatively high intrinsic viscosity (I.V.) in the bristle of at least 0.60. This high viscosity is important because it assures adequate stiffness in the bristles. To achieve this viscosity in the bristle, the polymer fed to the extruder should have a viscosity of at least about 0.80, and the polymer and filler must be kept relatively dry.

The polybutylene terephthalate used herein is preferably derived from the polycondensation of 1,4-butanediol and dimethyl terephthalate or terephthalic acid, but may be derived from other well known raw materials. The polybutylene terephthalate in the bristle has an intrinsic viscosity (I.V.) ranging between about 0.60 and about 1.20, with a preferred I.V. ranging between about 0.7 and about 1.0. Intrinsic viscosity is obtained by extrapolation of viscosity values to zero concentration of solutions of polybutylene terephthalate in a 60 to 40 weight/volume ratio of phenol and tetrachloroethane. The measurements are made at 25° C. The polybutylene terephthalate melts between about 223° C. and about 229° C. The polybutylene terephthalate can contain minor amounts, up to about 5 percent, of other comonomers such as 1,4, cyclohexyldimethyldiol, butyldiol, neopentyldiol, diethylene glycol, or glutaric acid.

The abrasive fillers usable include silicon carbide, aluminum oxide, asbestos particles, diamond particles, ceramic particles, etc. The range of filler in the final product is from about 5 to about 50 percent by weight of the bristle, preferably 15–30 percent.

The present invention is particularly useful in abrasive filled bristle materials wherein the abrasives have a hardness value, as rated by the Knoop Scale, greater than about 80 and preferably greater than about 1000. The Knoop Scale values are determined by measuring the indentation resulting when a weighted diamond pyramid penetrates the test material. Thus, the hardness value is expressed as the load in kilograms divided by the projected area in square millimeters.

In addition to the aforementioned hardness, the abrasives found most useful were those which will pass through a screen size of about 10 to about 1,500 mesh, preferably about 80 to about 500. Accordingly, the abrasive filler may be aluminum oxide or silicon carbide each having a grit size ranging from about 10 to about 1,500 mesh, preferably about 80 to about 500 and a hardness value of about 1,250 to about 1,750 for aluminum oxide and about 2,130 to about 2,500 for silicon carbide, or the abrasive filler may be diamond dust having a grit size of about 80 to about 320 and a hardness value of about 5,500 to about 6,950. Although aluminum oxide, silicon carbide, and diamond dust are the preferred abrasive fillers, other abrasives having the aforementioned hardness and grit sizes can be utilized. Representative examples of other abrasives employable in the present process are boron carbide, tungsten carbide, tantalum carbide, and the like.

The extruded bristles may be produced by the process described in U.S. Pat. No. 3,522,342, which is hereby incorporated herein by reference. The total stretch imparted to the bristles is preferably approximately 2 to 4 times their original length. This stretching results in superior tensile modulus and Bend Recovery.

The products of the present invention are in the form of a strand having a wide variety of crosssectional configurations and have a diameter from about 0.01 inch to 0.09 inch, preferably 0.02–0.07 inch.

The extruded products of the present invention may be cut into unit lengths, such as about 5 to about 10 inches, thereby forming bristles which can be utilized in making abrasive wheels. The unit lengths may be about 2 about 3 feet long for use in making brooms.

Suprisingly, it has been found that when a polybutylene terephthalate is used, preferably having an I.V. of about 0.60 to about 1.20, the resulting bristle has stiffness expressed as tensile modulus superior to that of nylon alone and the bend recovery is superior to that of the polyethylene terephthalate, thus providing on balance a product with acceptable bend recovery and superior stiffness relative to nylon.

The following examples are examplary of the present invention.

EXAMPLE I

Utilizing the two extruder system shown in U.S. Pat. No. 3,522,342, strands consisting essentially of a polybutylene terephthalte matrix containing about 24%, by weight of the total strand, of silicon carbide abrasive were extruded into a water bath, as shown in reference numeral 4 of said patent, being maintained at a temperature of about 20° C. to 40° C. and subsequently taken up over rolls, as shown in reference numeral 54 of said patent, to a take up reel. The strands were subsequently stretched 3.6 times their original length on an Instron Model 1125 Stretcher at a temperature of about 90° C. to obtain bristles having a diameter of about 0.030 inches. The Bend Recovery and the Tensile Modulus, tested dry and Hot Wet, were as follows:

| DRY | | HOT WET[1] | |
| --- | --- | --- | --- |
| 20° C. - 65% RH | | | |
| TM[2] (gpd) | Bend[3] Recovery | TM[2] (gpd) | Bend[3] Recovery |
| 11 | 70% | 11 | 80% |

[1] Hot Wet conditions are simulated by immersing samples in boiling water for 15 minutes, then testing after removing from the water.

[2] TM = Tensile Modulus which is determined by the method described in ASTM-D885, immediately after removing from the water, in the case of hot wet conditions.

[3] Bend Recovery is a test in which the bristle material is coiled 10 times around 0.25 inch diameter mandrel, placed in water for 1 hour at room temperature, and then slid off the mandrel and allowed to sit for 1 hour during which time the coils tend to expand. After the 1 hour period, the remaining coils are counted. The number of coils remaining (N) is used to determine Percent Bend Recovery (BR) according to the following formula: B = (10 − N)10 (In the case of "Hot Wet" conditions the strand is allowed to cool to room temperature before subjecting it to the Bend Recovery Test.)

EXAMPLE 2

Repeat Example 1 but include in the bristle material, 24% by weight of aluminum oxide based on the total weight of the bristle.

EXAMPLE 3

Repeat Example 1 but use 20 weight precent aluminum oxide based on the total weight of the bristle.

While exemplary embodiments of the invention have been described, the true scope of the invention is to be determined from the following claims.

While exemplary embodiments of the invention have been described, the true scope of the invention is to be determined from the following claims.

What is claimed is:

1. A bristle material comprised of a thermoplastic matrix and an abrasive filler material dispersed therein;
   (a) said bristle material having a diameter ranging from about 0.02 to 0.09 inches
   (b) said thermoplastic matrix consisting essentially of polybutylene terephthalate having an intrinsic viscosity of at least about 0.60; and
   (c) said abrasive filler being present in an amount of about 5 to about 50 weight percent based on the total weight of the bristle.

2. The bristle material of claim 1 wherein the abrasive material has a Knoop Scale hardness of greater than about 1,000, is present in concentrations ranging from about 15 to about 30 percent based on the weight of the filled bristle, and has a grit size passing through a screen size of about 10 to about 1,500 mesh.

3. The bristle material of claim 3 wherein the abrasive material has a grit size passing through a screen size about 80 to about 500.

4. The bristle material of claim 3 wherein the abrasive material silicon carbide and has a Knoop Scale hardness of about 2,130 to 2,500.

5. The bristle material of claim 3 wherein the abrasive material is aluminum oxide having a Knoop Scale hardness of about 1,250 to 1,750.

6. The bristle material of claim 1 wherein the bristle material has a diameter ranging from about 0.02 inches to about 0.06 inches.

* * * * *

UNITED STATES PATENT AND TRADEMARK OFFICE
CERTIFICATE OF CORRECTION

PATENT NO. : 4,585,464
DATED : April 29, 1986
INVENTOR(S) : John C. Haylock, Peter R. Saunders, Garland L. Turner, Ian C. Twilley It is certified that error appears in the above-identified patent and that said Letters Patent are hereby corrected as shown below:

Cover page, column 1 Inventors change "R. Saunders" to
--Peter R. Saunders--.

Signed and Sealed this

Fourteenth Day of October, 1986

[SEAL]

*Attest:*

DONALD J. QUIGG

*Attesting Officer*  *Commissioner of Patents and Trademarks*